(12) United States Patent
Fisher et al.

(10) Patent No.: US 8,541,058 B2
(45) Date of Patent: Sep. 24, 2013

(54) PALLADIUM THIOLATE BONDING OF CARBON NANOTUBES

(76) Inventors: Timothy S. Fisher, West Lafayette, IN (US); Stephen L. Hodson, West Lafayette, IN (US); Baratunde A. Cola, Atlanta, GA (US); Thiruvelu Bhuvana, Chennai (IN); Giridhar Kulkarni, Bangalore (IN)

( * ) Notice: Subject to any disclaimer, the term of this patent is extended or adjusted under 35 U.S.C. 154(b) by 444 days.

(21) Appl. No.: 12/719,759

(22) Filed: Mar. 8, 2010

(65) Prior Publication Data

US 2011/0020539 A1 Jan. 27, 2011

Related U.S. Application Data

(60) Provisional application No. 61/158,187, filed on Mar. 6, 2009, provisional application No. 61/234,270, filed on Aug. 15, 2009.

(51) Int. Cl.
*B05D 3/02* (2006.01)

(52) U.S. Cl.
USPC .................................................. 427/376.6

(58) Field of Classification Search
USPC ...................................................... 427/376.6
See application file for complete search history.

(56) References Cited

U.S. PATENT DOCUMENTS

| | | | |
|---|---|---|---|
| 6,156,256 A | 12/2000 | Kennel | |
| 6,283,812 B1 | 9/2001 | Jin et al. | |
| 6,359,334 B1 | 3/2002 | Jiang | |
| 6,383,923 B1 | 5/2002 | Brown | |
| 6,407,922 B1 | 6/2002 | Eckblad et al. | |
| 6,628,053 B1 | 9/2003 | Den et al. | |
| 6,682,677 B2 | 1/2004 | Lobovsky et al. | |
| 6,713,519 B2 * | 3/2004 | Wang et al. | 518/715 |
| 6,737,939 B2 | 5/2004 | Hoppe | |
| 6,741,019 B1 | 5/2004 | Filas et al. | |

(Continued)

FOREIGN PATENT DOCUMENTS

| | | |
|---|---|---|
| EP | 1134304 | 9/2001 |
| JP | 2005228954 | 8/2005 |

(Continued)

OTHER PUBLICATIONS

Bower et al "Plasma Induced Alignment of Carbon Nanotubes" Appl. Phys. Lett. 77 (2000) p. 830-832.*

(Continued)

*Primary Examiner* — Nathan Empie
(74) *Attorney, Agent, or Firm* — John V. Daniluck; Brian W. Chellgren; Bingham Greenebaum Doll LLP (57) ABSTRACT

Carbon nanotube (CNT) arrays are attractive thermal interface materials with high compliance and conductance that can remain effective over a wide temperature range. Disclosed herein are CNT interface structures in which free CNT ends are bonded using palladium hexadecanethiolate $Pd(SC_{16}H_{35})_2$ to an opposing substrate (one-sided interface) or opposing CNT array (two-sided interface) to enhance contact conductance while maintaining a compliant joint. The palladium weld is mechanically stable at high temperatures. A transient photoacoustic (PA) method is used to measure the thermal resistance of the palladium bonded CNT interfaces. The interfaces were bonded at moderate pressures and then tested at 34 kPa using the PA technique. At an interface temperature of approximately 250° C., one-sided and two-sided palladium bonded interfaces achieved thermal resistances near 10 $mm^2$ K/W and 5 $mm^2$ K/W, respectively.

17 Claims, 8 Drawing Sheets

(56) References Cited

U.S. PATENT DOCUMENTS

| | | | |
|---|---|---|---|
| 6,764,628 B2 | 7/2004 | Lobovsky et al. |
| 6,831,359 B2 | 12/2004 | Heilbronner |
| 6,911,260 B2 | 6/2005 | Ren et al. |
| 6,913,075 B1 | 7/2005 | Knowles et al. |
| 6,965,513 B2 | 11/2005 | Montgomery et al. |
| 6,982,874 B2 | 1/2006 | Smalc et al. |
| 6,994,584 B1 | 2/2006 | Santana, Jr. et al. |
| 7,086,451 B2 | 8/2006 | Leu et al. |
| 7,105,596 B2 | 9/2006 | Smallet et al. |
| 7,109,581 B2 | 9/2006 | Dangelo et al. |
| 7,168,484 B2 | 1/2007 | Zhang et al. |
| 7,273,095 B2 | 9/2007 | Li et al. |
| 7,311,967 B2 | 12/2007 | Dani et al. |
| 7,354,877 B2 | 4/2008 | Rosenberger et al. |
| 7,393,428 B2 | 7/2008 | Huang et al. |
| 7,459,013 B2 | 12/2008 | Holmes |
| 7,477,527 B2 | 1/2009 | Suhir |
| 7,479,516 B2 | 1/2009 | Chen et al. |
| 7,507,987 B2 | 3/2009 | Kim et al. |
| 7,535,715 B2 | 5/2009 | Chung |
| 7,538,422 B2 | 5/2009 | Dangelo et al. |
| 7,674,410 B2 | 3/2010 | Huang et al. |
| 2003/0117770 A1 | 6/2003 | Montgomery et al. |
| 2003/0179559 A1 | 9/2003 | Engelhardt et al. |
| 2003/0231471 A1 | 12/2003 | De Lorenzo et al. |
| 2004/0009353 A1 | 1/2004 | Knowles |
| 2004/0261987 A1 | 12/2004 | Zhang et al. |
| 2004/0265489 A1 | 12/2004 | Dubin |
| 2004/0266065 A1 | 12/2004 | Zhang et al. |
| 2005/0037204 A1 | 2/2005 | Osiander et al. |
| 2005/0046017 A1 | 3/2005 | Dangelo |
| 2005/0061496 A1 | 3/2005 | Matabayas, Jr. |
| 2005/0064185 A1 | 3/2005 | Buretea et al. |
| 2005/0092464 A1 | 5/2005 | Leu et al. |
| 2005/0145367 A1* | 7/2005 | Hannah et al. ............... 165/80.3 |
| 2005/0180113 A1 | 8/2005 | Shirakami et al. |
| 2005/0215049 A1 | 9/2005 | Horibe et al. |
| 2005/0224220 A1 | 10/2005 | Li et al. |
| 2005/0238810 A1 | 10/2005 | Scaringe et al. |
| 2005/0255304 A1 | 11/2005 | Brink |
| 2005/0260412 A1 | 11/2005 | Gardner |
| 2006/0032622 A1 | 2/2006 | Yen et al. |
| 2006/0068195 A1 | 3/2006 | Majumdar et al. |
| 2006/0083927 A1 | 4/2006 | Von Ehr |
| 2006/0118791 A1 | 6/2006 | Leu et al. |
| 2006/0157223 A1 | 7/2006 | Gelome et al. |
| 2006/0163622 A1 | 7/2006 | Montgomery et al. |
| 2006/0208354 A1 | 9/2006 | Liu et al. |
| 2006/0231946 A1 | 10/2006 | Pan et al. |
| 2006/0234080 A1 | 10/2006 | Seidel et al. |
| 2007/0116626 A1 | 5/2007 | Pan et al. |
| 2007/0116957 A1 | 5/2007 | Pan et al. |
| 2008/0075954 A1 | 3/2008 | Wardle et al. |
| 2008/0131655 A1 | 6/2008 | Wacker et al. |
| 2008/0131722 A1 | 6/2008 | Suhir et al. |
| 2008/0149322 A1 | 6/2008 | Ottinger et al. |
| 2009/0061217 A1 | 3/2009 | Silva et al. |
| 2011/0059317 A1* | 3/2011 | Elhard et al. ................ 428/408 |

FOREIGN PATENT DOCUMENTS

| | | |
|---|---|---|
| WO | 2004090944 | 10/2004 |
| WO | 2005028549 | 3/2005 |
| WO | 2006048848 | 5/2006 |
| WO | WO 2006080702 A1 * | 8/2006 |
| WO | WO 2007089550 A2 * | 8/2007 |
| WO | 2007137095 | 11/2007 |
| WO | 2008112013 | 9/2008 |
| WO | 2008121970 | 10/2008 |

OTHER PUBLICATIONS

Notice of Allowance and Fees(s) Due for U.S. Appl. No. 11/873,952, Apr. 13, 2012, 4 pages, USPTO, Alexandria, Virgina.

Cedric A. D'Hue, Amendment After Final Office Action for U.S. Appl. No. 11/873,952, Mar. 27, 2012, 4 pages, Bingham Greenebaum Doll, Indianapolis, Indiana.

Cedric A. D'Hue, Amendment After Final Office Action for U.S. Appl. No. 11/873,952, Mar. 23, 2012, 18 pages, Bingham Greenebaum Doll, Indianapolis, Indiana.

Advisory Action for U.S. Appl. No. 11/873,952, Feb. 23, 2012, 3 pages, USPTO, Alexandria, Virginia.

Cedric D'Hue, Request for Advisory Action for U.S. Appl. No. 11/873,952, Feb. 13, 2012, 19 pages, Bingham Greenebaum Doll, Indianapolis, Indiana.

Final Action for U.S. Appl. No. 11/873,952, Dec. 13, 2011, 15 pages, USPTO, Alexandria, Virginia.

John Daniluck, Amendment & Response to OA for U.S. Appl. No. 11/873,952, Sep. 20, 2011, 30 pages, Bingham McHale, Indianapolis, IN.

NonFinal Office Action for U.S. Appl. No. 11/873,952, Apr. 28, 2011, 7 pages, USPTO, Alexandria, VA.

Examiner's Report for Canadian Patent Application 2,666,815, Dec. 9, 2011, 3 pages, Canadian Intellectual Property Office, Hull, Quebec, Canada.

Marks & Clerk, Amendment/Remarks After Examiner's Report for Canadian Patent Application 2,666,815, Jun. 8, 2012, 11 pages, Ottawa, Ontario, Canada.

Chung, D.D.L., "Materials for Thermal Conduction", Applied Thermal Engineering 21 (2001) 1593-1605.

Seaman, Christopher, et al., "Carbon Velvet Thermal Interface Gaskets", American Institute of Aeronautics & Astronautics, Paper for 39th AIAA Aerospace Sciences Meeting, Session: Spacecraft Thermal Control & Technology, Reno, Nevada, Jan. 8-11, 2001.

Tong, Tao, et al., "Vertically Aligned Multi-Walled Carbon Nanotube Arrays as Thermal Interface materials and Measurement Technique", Proceedings of IMECE2005, 2005 ASME International Mechanical Engineering Congress and Exposition, Nov. 5-11, 2005, Orlando, FL USA.

Xu, Jun, et al., "Enhancement of Thermal Interface Materials with Carbon Nanotube Arrays", Int'l Journal of Heat & Mass Transfer 49 (2006) 1658-1666.

Park, Myounggu, et al., "Effects of a Carbon Nanotube Layer on Electrical Contact Resistance Between Copper Substrates", Institute of Physics Publishing, Nanotechnology 17 (2006) 2294-2303.

Xu, Jun, et al., "Enhanced Thermal Contact Conductance Using Carbon Nanotube Array Interfaces", IEEE Transactions on Components & Packaging Technologies, vol. 29, No. 2, Jun. 2006.

Wang, C.Y., et al. "Flexible Field Emitter Made of Carbon Nanotubes Microwave Welded onto Polymer Substrates", Applied Physics Letters, vol. 90, 103111, (2007).

Li et al., "Highly-ordered nanotube arrays for electronics applications," American Institute of Physics, vol. 75, No. 3, Jul. 1999, pp. 367-369.

Yovanovich, "Effect of Folis Upon Joint Resistance: Evidence of Optimum Thickness," presented at AIAA 7th Thermophysics Conference, San Antonio, TX, Apr. 10-12, 1972.

Han, I.T. et al., "Effect of Al and catalyst thickness on the growth of carbon nanotubes and application to gated field," Chemical Physics Letters (2004, 400 (1-3), pp. 139-144.

* cited by examiner

PALLADIUM THIOLATE BONDING OF CARBON NANOTUBES

CROSS REFERENCE TO RELATED APPLICATION

This application claims the benefit of priority to U.S. Provisional Patent Application Ser. No. 61/158,187, filed Mar. 6, 2009, entitled MOLECULAR DOPING OF CARBON NANOTUBE THERMAL INTERFACE MATERIALS, and U.S. Provisional Patent Application Ser. No. 61/234,270, filed Aug. 15, 2009, entitled PALLADIUM THIOLATE BONDING OF CARBON NANOTUBES, both of which are incorporated herein by reference.

GOVERNMENT RIGHTS

This invention was made with government support under grant number N66001-09-C-2013 awarded by the U.S. Navy. The government has certain rights in the invention.

FIELD OF THE INVENTION

Various embodiments of the present invention pertain to apparatus and methods for reducing the thermal or electrical interface resistance between two devices that are in contact and, more particularly, to improvements by using an interface including carbon nanoparticles that have been altered with either electron-donating molecules or electron-withdrawing molecules.

BACKGROUND OF THE INVENTION

As the size of electronic devices scales down and power densities increase, the demand for innovative cooling solutions becomes more imperative. Thermal interface materials (TIMs) such as thermal greases and gels with highly conductive particle additives are commonly used in microprocessor cooling solutions where operating temperatures are near 100° C. However, recent reliability tests on polymeric TIMs using thermogravitic analysis revealed a dramatic increase in thermal interface resistance as operating temperatures and exposure times increased. Because of their high thermal conductivity, mechanical compliance, and stability over a wide temperature range, carbon nanotubes have been extensively studied as conductive elements. Several recent reports have shown that dense, vertically aligned CNT arrays are viable alternatives to current state-of-the-art TIMs. However, when contact sizes between a nanotube and an opposing surface become comparable to the mean free path of the dominant energy carriers, nanoscale constriction resistance becomes important. For CNT TIMs similar to those in this study, the resistive component at the CNT 'free tip' and opposing metal substrate has been shown to cause the largest constriction of heat flow in comparison to the bulk CNT and growth substrate resistances [9]. Reduction of this 'free tip' constrictive resistance using novel CNT TIM composite structures is shown in several embodiments of the inventions disclosed herein.

Recent thermal resistance values for CNT based TIMs have been measured to be between 1-20 $mm^2$ K/W. The thermal resistance values include both bonded and non-bonded interfaces, and measurements were obtained using different characterization techniques (1D reference bar, thermoreflectance, photoacoustic, and 3-omega). Weak bonding at heterogeneous interfaces, differences in phonon dispersion and density of states, and wave constriction effects are factors that could hinder further reduction in thermal contact resistance. Adverse phonon constriction can be moderated by increasing the interfacial contact area. In an effort to increase the interfacial contact area, developments in bonded and semi-bonded CNT TIMs have rendered thermal interface resistances as low as 1.3 $mm^2$ K/W and 2 $mm^2$ K/W, respectively. CNTs exhibit ballistic conduction of electrons in the outermost tubes and ohmic current-voltage characteristics with certain metals. When this effect is coupled with a strong metallic-like bond at the CNT/metal substrate interface, phonon constriction could be circumvented by using electrons as a secondary energy carrier. A possible way to achieve electron transmission is through a strong CNT/metal substrate bond and sufficiently high electron DOS at the interface.

Silicon carbide (SiC), with a band gap near 3.3 eV, is attractive for high-temperature power electronic applications such as high-voltage switching for more efficient power distribution and electric vehicles, powerful microwave electronics for radar and cellular communications, and fuel efficient jet aircraft and automobile engines. At high temperatures, phonon scattering with charge carriers increases while the charge carrier mobility, which dictates electrical conductivity, is adversely affected. In order to maintain sufficient electrical conductivities for reliable operation in such applications, innovative heat dissipation methods that can withstand high temperature environments are necessary.

With regards to the performance of a Si/CNT interface with a commercial phase change material (PCM) applied to a CNT array, there is a decrease in thermal resistance of approximately 10 $mm^2$ K/W between Si/PCM/Cu interfaces and Si/CNT/PCM/Cu interfaces, which achieved a low value of approximately 5 $mm^2$ K/W at 350 kPa. Also, there can be a 50% reduction in thermal interface resistance by wicking paraffin wax into CNT arrays grown on both sides of Cu foil. It is possible that such improvement is the result of an increase in contact area and reduction in constriction resistance at the 'free tip' interface. However, PCMs and paraffin wax suffer similar disadvantages as polymeric TIMs at high temperatures. In contrast, thermal resistances near 10 $mm^2$ K/W in a dry SiC/CNT/Ag interface can be achieved, with the possibility of a weak dependence of thermal interface resistance on temperatures up to 250° C., indicating that the TIM was suitable for high temperature applications.

What is needed are thermal interface materials and construction methods that have lowered thermal interface resistance and improved long term characteristics. Various embodiments of the present invention do this in novel and unobvious ways.

SUMMARY OF THE INVENTION

Various embodiments of the present invention pertain to altering the charge density of carbon nanotubes to add to the effectiveness of CNT thermal interface materials.

While heat conduction in carbon nanotubes is commonly dominated by phonon transport, some embodiments of the present invention pertain to methods for opening channels for electron transport to provide an alternative transport path that is particularly useful at interfaces, where the longer phonon wavelength and/or lower electron densities can dramatically impede transport.

In some embodiments, CNT TIMs are enhanced with Pd nanoparticles using a method for CNT synthesis and a process for bonding interfaces using Pd hexadecanethiolate. Structures enhanced with Pd nanoparticles exhibited improved thermal performance and thermal interface resistances that are comparable to previously reported values in the literature and that can outperform some state-of-the-art TIMs used in industry.

Various embodiments of the present invention pertain to thermal interface materials (TIMs) that have enhanced thermal stability across a wide temperature range. Structures made according to these various embodiments are suitable for a variety of applications, particularly high temperature electronics.

One embodiment of the present invention pertains to a method including providing a growth substrate and growing carbon nanotubes from the growth substrate. Still further embodiments include applying a solution containing a metal organic compound to the nanotube array and thermally decomposing the solution around the nanotubes and substrate.

Another embodiment of the present invention pertains to a method including growing carbon nanotubes from the growth substrate, each nanotube being anchored at one end to the growth substrate, and altering the density of states of energy carriers in the nanotubes.

Yet another embodiment of the present invention pertains to a method for fabricating a thermal interface, including providing a first growth substrate and a second substrate. Yet other embodiments include growing a first plurality of carbon nanotubes from a first surface of the first growth substrate, each nanotube of the first plurality being anchored at one end to the first surface. Still other embodiments include placing a second plurality of carbon nanotubes on a second surface of the second growth substrate. Still further embodiments include placing the first plurality of nanotubes in contact with the second plurality of nanotubes and applying a solution containing a metal organic compound to the contacting nanotubes, and thermally decomposing the solution.

Another embodiment of the present invention pertains to a method for fabricating a thermal interface. Other embodiments include providing a first growth substrate and a second growth substrate. Yet other embodiments include growing a first plurality of carbon nanotubes from a first surface of the first growth substrate, and growing a second plurality of carbon nanotubes from a second surface of the second growth substrate. Yet other embodiments further include placing the first plurality of nanotubes in contact with the second plurality of nanotubes with the first surface being opposite of the second surface and altering the density of states of an energy carrier in the contacting nanotubes.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is excessive and unnecessary.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that must be included in all embodiments, unless otherwise stated.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only. Further, with discussion pertaining to a specific composition of matter, that description is by example only, and does not limit the applicability of other species of that composition, nor does it limit the applicability of other compositions unrelated to the cited composition.

This application incorporates by reference U.S. patent application Ser. No. 11/873,952, titled ELECTROTHERMAL INTERFACE MATERIAL ENHANCER to inventors Fisher and Cola.

Some embodiments of the present invention utilize CNT TIMs enhanced with palladium (Pd) nanoparticles to achieve low thermal interface resistances suitable for electronics in a wide temperature range. Several possible enhancements of CNTs with Pd nanoparticles are disclosed herein. One enhancement is an increase in contact area between the CNT 'free tips' and an opposing metal substrate that is formed from the Pd weld. This increase in contact area mitigates the phonon bottleneck at the CNT/metal substrate interface. Another concerns increasing electron density of states (DOS) near the Fermi level at the CNT/metal substrate interface that is a result of charge transfer between CNTs and Pd nanoparticles. In some embodiments, it is possible that electrons are used as a secondary energy carrier at the interface. One- and two-sided interfaces, comprised of CNT arrays grown on Si substrates, are bonded to opposing metal substrates using a new method that utilizes the behavior of Pd hexadecanethiolate upon thermolysis. Using a transient PA technique, bulk and component thermal interface resistances of the Pdbonded CNT interfaces were resolved.

In one embodiment, CNT TIMs enhanced with Pd nanoparticles were fabricated using a new process for bonding interfaces using Pd hexadecanethiolate. A transient photoacoustic technique was used to resolve bulk and component thermal interface resistances. Structures enhanced with Pd nanoparticles exhibited improved thermal performance and thermal interface resistances that are comparable to previously reported values in the literature and that outperform most state-of-the-art TIMs used in industry. It is possible that the majority of improved performance can be attributed to the Pd weld that reduced phonon reflection at the interface by increasing the contact area between the CNT 'free-tips' and an opposing metal substrate. In addition, some embodiments contemplate utilizing electrons as a secondary energy carrier at the interface because of an increase in electron density of states at the CNT/Ag interface. In some embodiments, it is possible that there is a dependence that electron transmission has on wave vector conservation and disorder. With thermal stability across a wide temperature range, these structures are suitable for a variety of applications, particularly high-temperature electronics.

Functionalizing CNTs with metal nanoparticles (Pt, Au, Pd, Ag, Au) has been an area of growing interest for a diverse set of applications. For example, a biosensor involving Au/Pd nanocubeaugmented SWCNTs showed significant increases in glucose sensing capabilities. The increased performance was attributed to a highly sensitive surface area, low resistance pathway at the nanocube-SWCNT interface, and selective enzyme adhesion, activity, and electron transfer at the enzyme, Au/Pd nanocube interfaces. Metal nanoparticles can adhere to CNTs through covalent or van der Waals interactions, which can lead to charge transfer. Single-walled CNTs interacting with Au and Pt nanoparticles can exhibit an increase in the ratio of metallic to semiconducting tubes. Charge density analysis showed a decrease in electron density in the valance band of Au and an increase in the outer orbitals of C, indicating direct charge transfer. There can also be changes in the Raman G-band peak intensity for pristine and silver nanoparticle-decorated metallic SWCNTs, indicating that the nanoparticles alter the electronic transitions of the tubes. With its high work function and strong adhesion to CNTs, Pd can be a metal that electronically couples well to CNTs. Additionally, efficient carrier injection from Pd monolayers to graphene can be accomplished because of the band structure that results from the hybridization between the d orbital of Pd and orbital of graphene.

Figure 1:
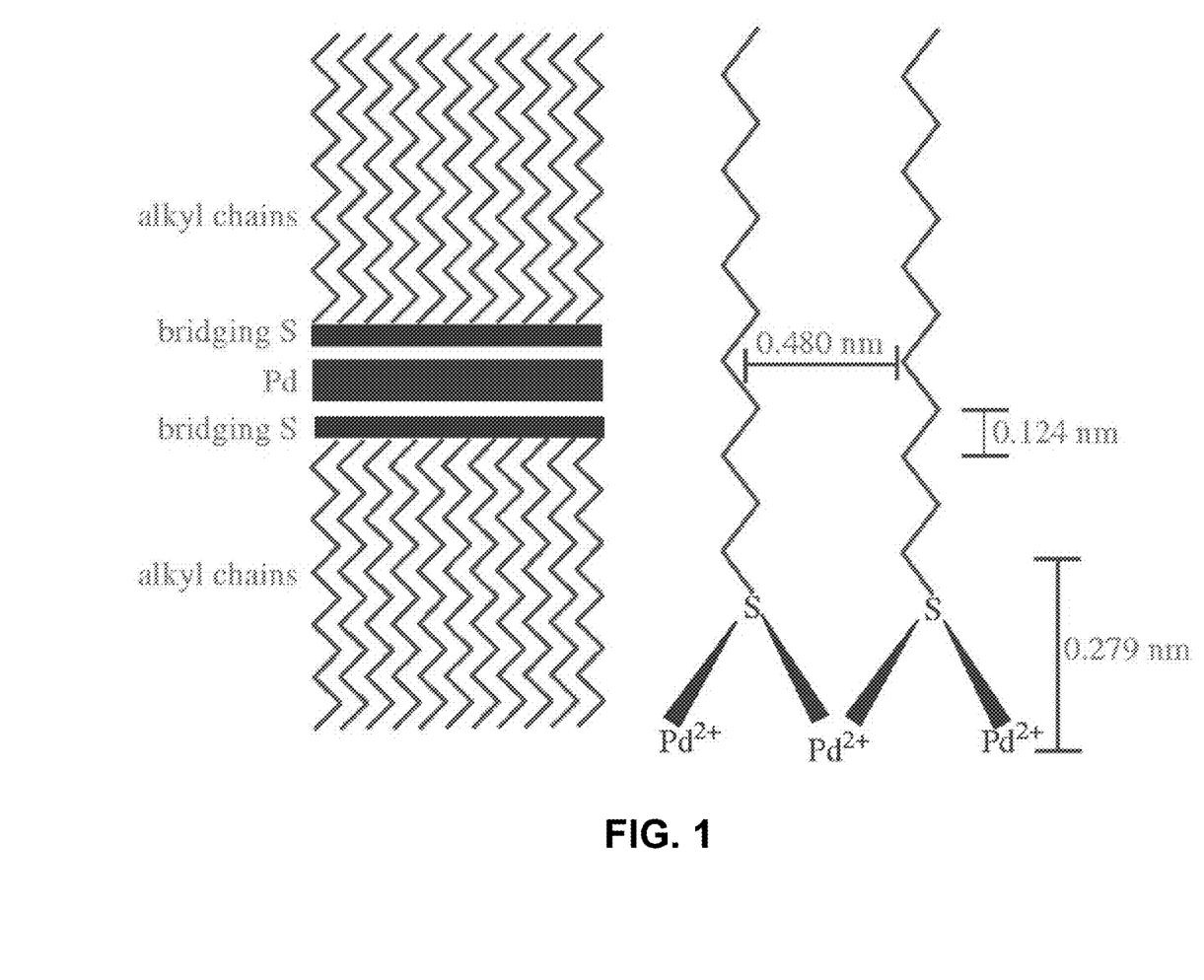
FIG. 1 is a schematic representation of a Pd(SC$_{16}$H$_{35}$)$_2$ structure.

Metal alkanethiolates can serve as sources of metal clusters upon thermolysis and yield either metal or metal sulfide nanoparticles. While some metal alkanethiolates are insoluble in most organic solvents, Pd alkanethiolates have been reported to be soluble in these solvents and also exhibit repeated self-assembly. The soluble nature of Pd alkanethiolates in such solvents makes them attractive for forming smooth, thin films on substrates. Some embodiments of the present invention use Pd hexadecanethiolate (FIG. 1) to coat the CNT sidewalls with Pd nanoparticles.

Pd hexadecanethiolate has been patterned using electron beam lithography and subsequent formation of Pd nanoparticles on thermolysis was demonstrated. Energy-dispersive spectral (EDS) values before and after thermolysis were 21:71:8 and 90:9.6:0.4 for (Pd:C:S), respectively. Most notably, electrical measurements yielded resistivity values of Pd nanoparticles that were similar to that of bulk Pd. Although what is shown and described is the use of a particular metal alkanethiolate, the present invention is not so limited, and pertains to the use of compounds including other metals, including iron, gold, and silver as examples. Further, other embodiments include the use of butane thiolates, including various metal butane thiolates, including palladium butane thiolate.

In one embodiment of the present invention, an apparatus is constructed as follows: an electron beam evaporative system was used to deposit a tri-layer metal catalyst stack consisting of 30 nm Ti, 10 nm Al, and 3 nm Fe on polished intrinsic Si substrates. For a two-sided interface, the tri-layer catalyst was deposited on both a Si substrate and 25 μm thick Cu foil purchased from Alfa Aesar (Puratronic®, 99.999% metals basis). Vertically oriented CNT arrays of moderately high density were then synthesized in a SEKI AX5200S microwave plasma chemical vapor deposition (MPCVD) system. The growth chamber was evacuated to 1 Torr and purged with $N_2$ for 5 min. The samples were heated in $N_2$ (30 sccm) to a growth temperature of 900° C. The $N_2$ valve was then closed and 50 sccm of $H_2$ was introduced to maintain a pressure of 10 Torr in the growth chamber. After the chamber pressure stabilized, a 200 W plasma was ignited and 10 sccm of CH4 was introduced to commence 10 minutes of CNT synthesis.

Figure 2:
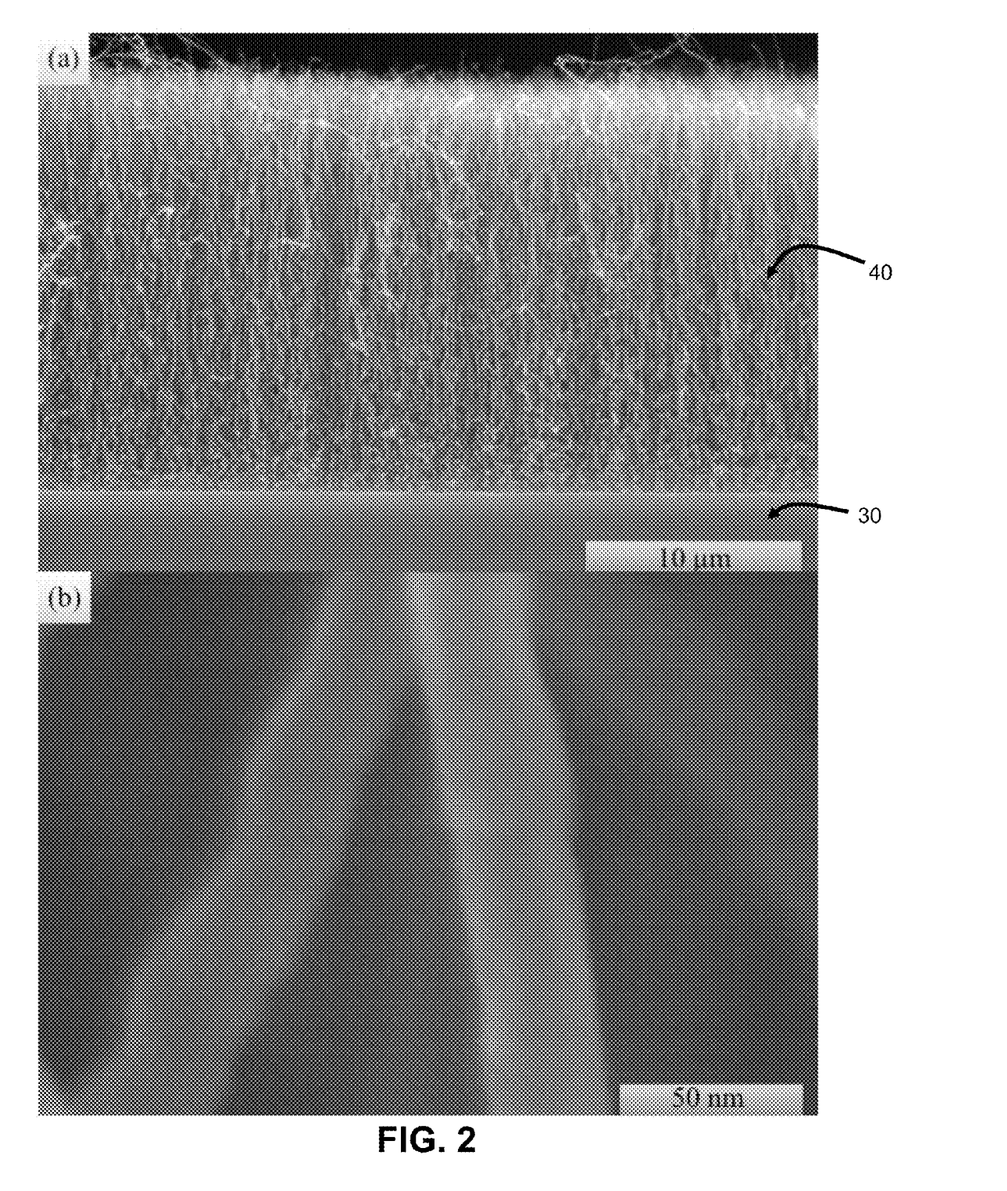
FIG. 2 are photographic representations showing CNT arrays synthesized on Si substrate: (a) FESEM cross-section image illustrating array height and (b) FESEM image illustrating CNT diameter.

The samples were imaged using a Hitachi field-emission scanning electron microscope (FESEM). FIG. 2 contains images of the vertically oriented CNT arrays 40 synthesized on a substrate 30 (such as silicon). CNT arrays 40 grown on Cu foil are similar. The array densities were approximately $10^8$-$10^9$ CNTs/mm$^2$. The average CNT diameter for each array was approximately 30 nm while the array heights were approximately 15-25 μm.

For preparation of Pd hexadecanethiolate, an equimolar solution of Pd(OAc)$_2$ (Sigma Aldrich) in toluene was added to hexadecanethiol and stirred vigorously. Following the reaction, the solution became viscous and the initial yellow color deepened to an orange-yellow color. The hexadecanethiolate was washed with methanol and acetonitrile to remove excess thiol and finally dissolved in toluene to obtain a 200 mM solution. Using a micropipette, approximately 16 μL of Pd hexadecanethiolate was added to the CNT array. The CNT array 40 was then heated for 5 minutes at 130° C. to evaporate the toluene. Finally, the sample was formed by sandwiching the structure under a pressure of 273 kPa and commencing thermolysis by baking at 250° C. for 2 hours in air. In yet other embodiments, the CNT array has applied to it solution including a metal acetate, thiol and toluene Although a particular process for decomposing has been shown and described, the present invention is not limited to these parameters, which are by way of example only. Further examples include, for those embodiments using a hexadecane thiolate, a range of temperatures from about 230 C to about 300 C. In those embodiments using a butane thiolate, another non-limiting range of temperatures is from about 160 C to about 300 C. Further, although thermolysis has been shown and described as being performed at a pressure of 273 kPa, it is understood that in other embodiments any range of pressure can be used, include 0 kPa applied pressure. Further, although thermolysis was accomplished in air, it is also understood that other embodiments are not so limited, and contemplate atmospheres of nitrogen or high vacuum.

Figure 3:
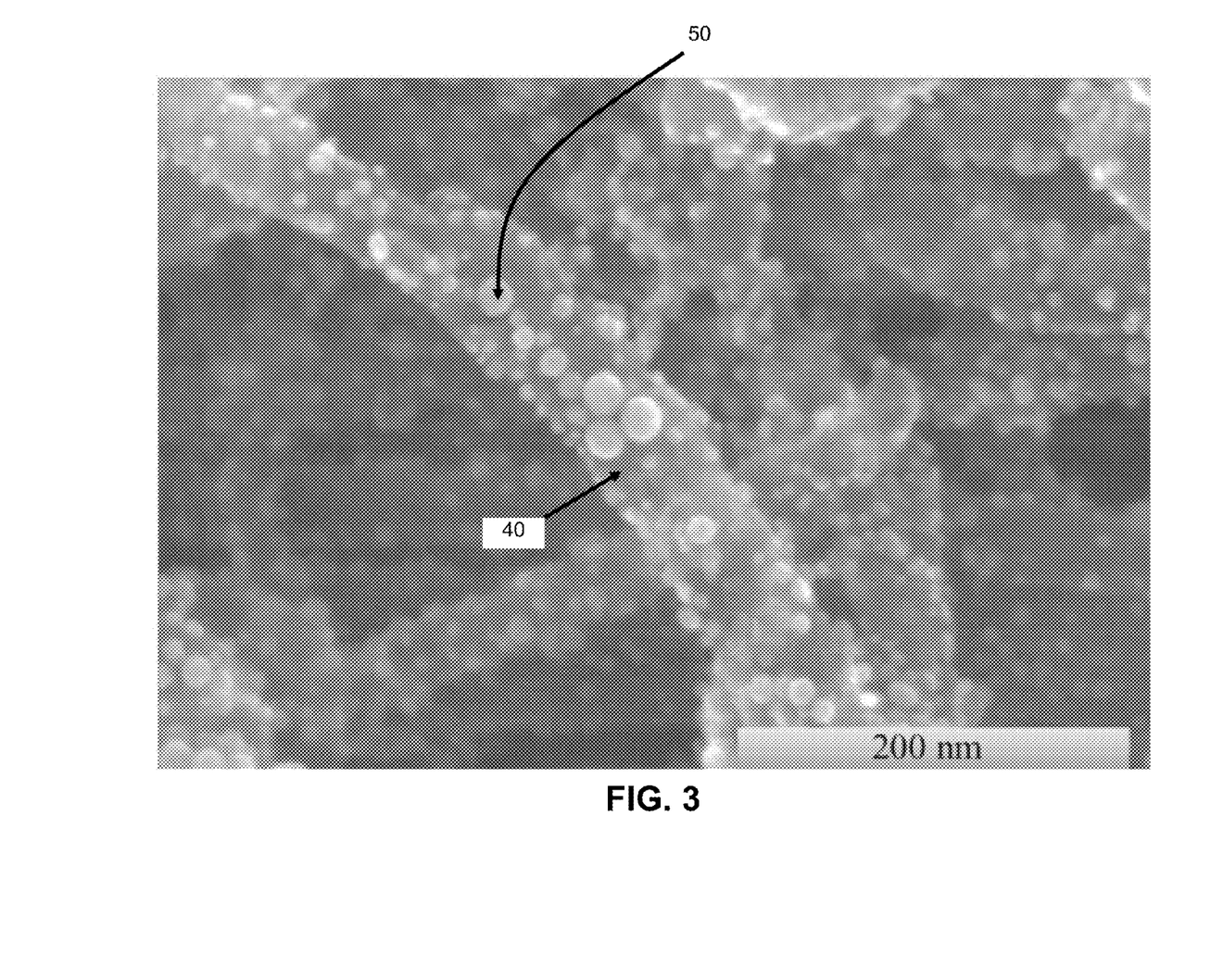
FIG. 3 is a photographic representation showing a post-thermolysis FESEM image of CNT array on Si substrate according to one embodiment of the present invention.

FIG. 3 contains an FESEM image of the CNT array 40 after thermolysis at 250° C. The Pd nanoparticles that decorate the CNT walls range from approximately 1 to 10 nm. It is possible that Pd nanoparticles 50 preferentially attach to defect sites in the CNT sidewalls. Therefore, in some embodiments of the present invention it is contemplated that additional defect sites may be created in the CNTs prior to their exposure to Pd. The control samples (no Pd hexadecanethiolate) were prepared under the same heating and loading conditions as above.

Various embodiments of the present invention contemplate thermal interfaces comprising a single layer of carbon nanotubes attached to a substrate and having free tips in contact with a second, opposing substrate. Yet other embodiments of the present invention contemplate two substrates, each having carbon nanotubes attached, in which the free tips of both sets of carbon nanotubes are in contact with each other.

Figure 4:
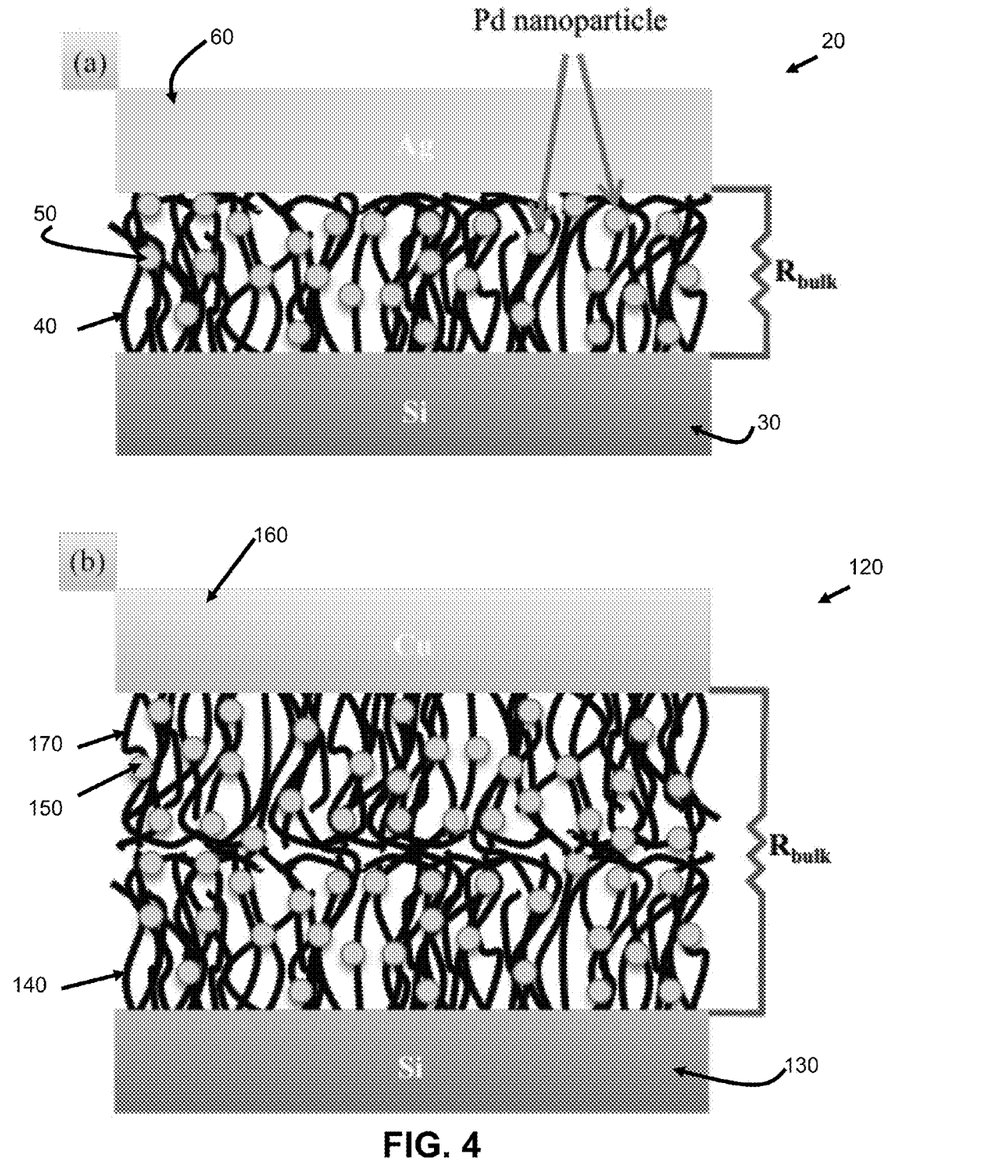
FIG. 4 are schematic representations of cross-sections of various TIM structures according to various embodiments of the present invention (a) Si/CNT/Ag and (b) Si/CNT/CNT/Cu.

FIG. 4(a) shows a thermal interface comprising a substrate 30 (such as silicon) from which a forest of nanotubes 40 has been grown. The nanotubes 40 are attached at one end to substrate 30. The other end of the CNTs 40 is free, such that the length of the nanotubes substantially extends away from substrate 30. A second substrate 60 (such as silver, copper, gold, or any suitable heat-conducting substrate) is placed opposite of the growth substrate 30, such that the array of carbon nanotubes 40 is located between the two substrates. The metal nanoparticles 50 (such as palladium nanoparticles) are subsequently introduced into the assembly 20 preferably by any of the methods described herein. As is noted herein, the nanoparticles can both decrease the thermal resistance from the free tip of the CNT 40 to the opposing substrate 60 as a "weld," but also the nanoparticles 40 can bond with more than one carbon nanotube 40, possibly through defect sites.

In some embodiments, substrate 30 can be utilized as part of a component with which it is desired to exchange heat. In some embodiments, assembly 20 can be a separate component that is applied to a thermal interface of a device such as an electronic component.

FIG. 4(b) shows an assembly 120 in which carbon nanotubes have been grown both from a first substrate 130, and also from a second substrate 160. Each array of carbon nanotubes (array 140 grown from substrate 130; and array 170 grown from substrate 160) are attached at one end to their respective substrate, with the other, free tip end of the CNTs being located away from the substrate. As shown in FIG. 4(b), assembly 120 is fabricated by placing the free tips of array 140 in contact with the free tips of array 170. After the two arrays of carbon nanotubes are placed into contact as shown in FIG. 4(b), metal nanoparticles can be attached, preferably by any of the methods shown herein. However, it is understood that yet other embodiments can have metal nanoparticles placed on these nanotubes by other means.

Figure 5:
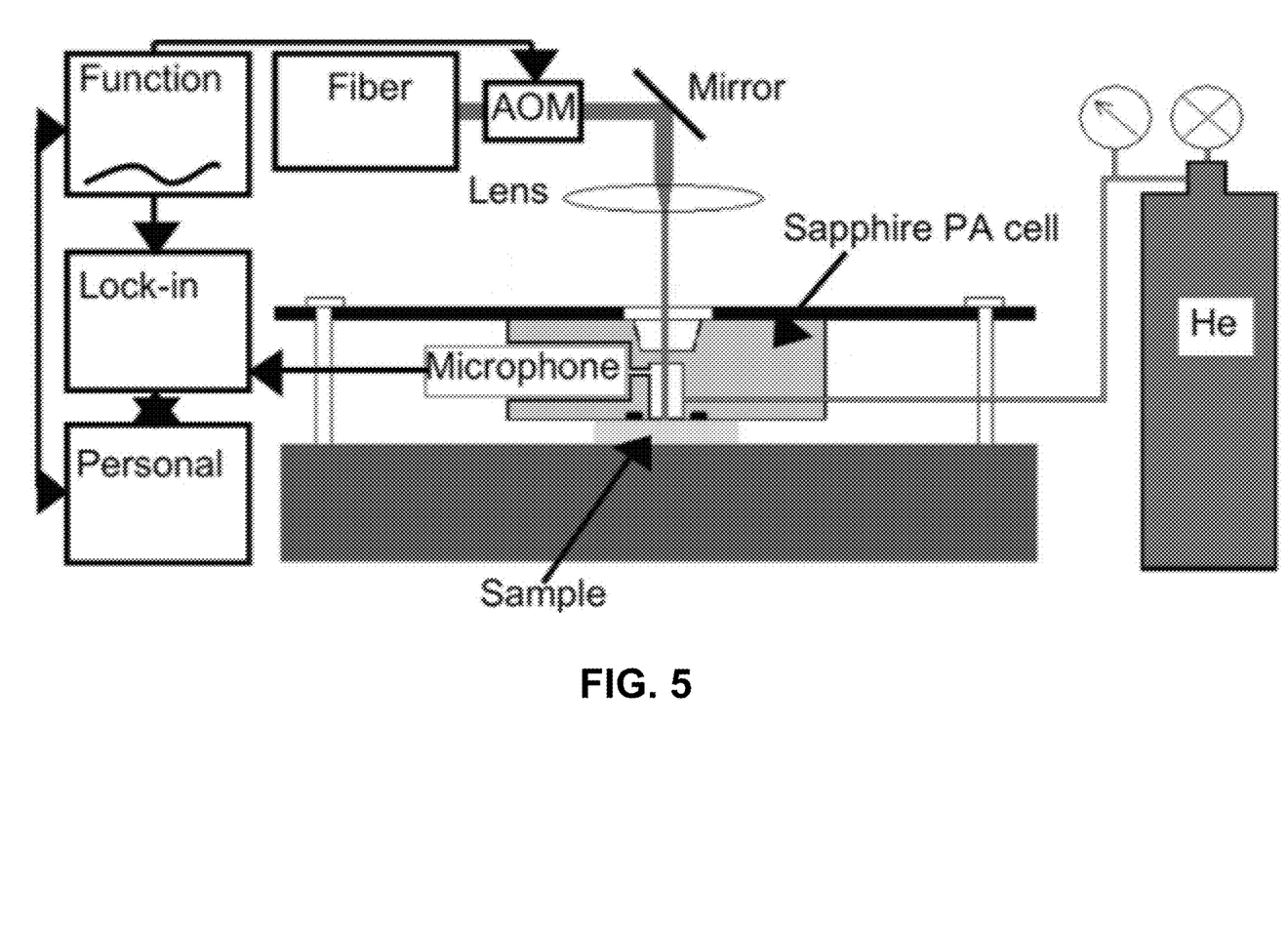
FIG. 5 is a schematic representation of a photoacoustic experimental setup.

A transient photoacoustic (PA) technique was used to characterize thermal interface resistances. FIG. 4 contains cross-sectional sketches for each multilayer sample type tested, and FIG. 5 shows the experimental setup. For a multilayer structure, the PA technique can resolve both bulk and component resistances in which the bulk resistance in FIG. 4a is defined as $$R_{bulk} = R_{Si-CNT} + R_{CNT} + R_{CNT-Ag} \quad (1)$$

where RCNT is the resistance of the CNT array and RSi—CNT and RCNT-Ag are the contact resistances at the Si—CNT and CNT-Ag interfaces, respectively. Briefly, in a given PA measurement the sample surface is surrounded by a sealed acoustic cell that is pressurized with He gas at 34 kPa. The sample is then heated over a range of frequencies by a 350 mW, modulated laser source. The thermal response of the multilayer sample induces a transient temperature field in the gas that is related to cell pressure. A microphone housed in the chamber wall measures the phase shift of the temperature-induced pressure response in the acoustic chamber. Using the acoustic signal in conjunction with a thermal model developed that is based on a set of one-dimensional heat conduction equations, thermal interface resistances are determined using a least-squares fitting method.

The PA technique was used to resolve bulk thermal interface resistances of one- and two-sided TIMs with configurations of Si/CNT/Ag and Si/CNT/CNT/Cu. The latter samples had CNT arrays grown on both the Si and Cu substrates, and the resulting interface formed a two-sided, Velcro™-like structure (see FIG. 4b). In addition, component resistances were resolved on a separate Si/CNT/Ag sample to elucidate possible mechanisms for enhanced performance. The samples used for measuring component resistances were not identical to those used to measure overall resistance. Specifically, a lower Pd thiolate concentration and bonding pressure were employed.

Figure 6:
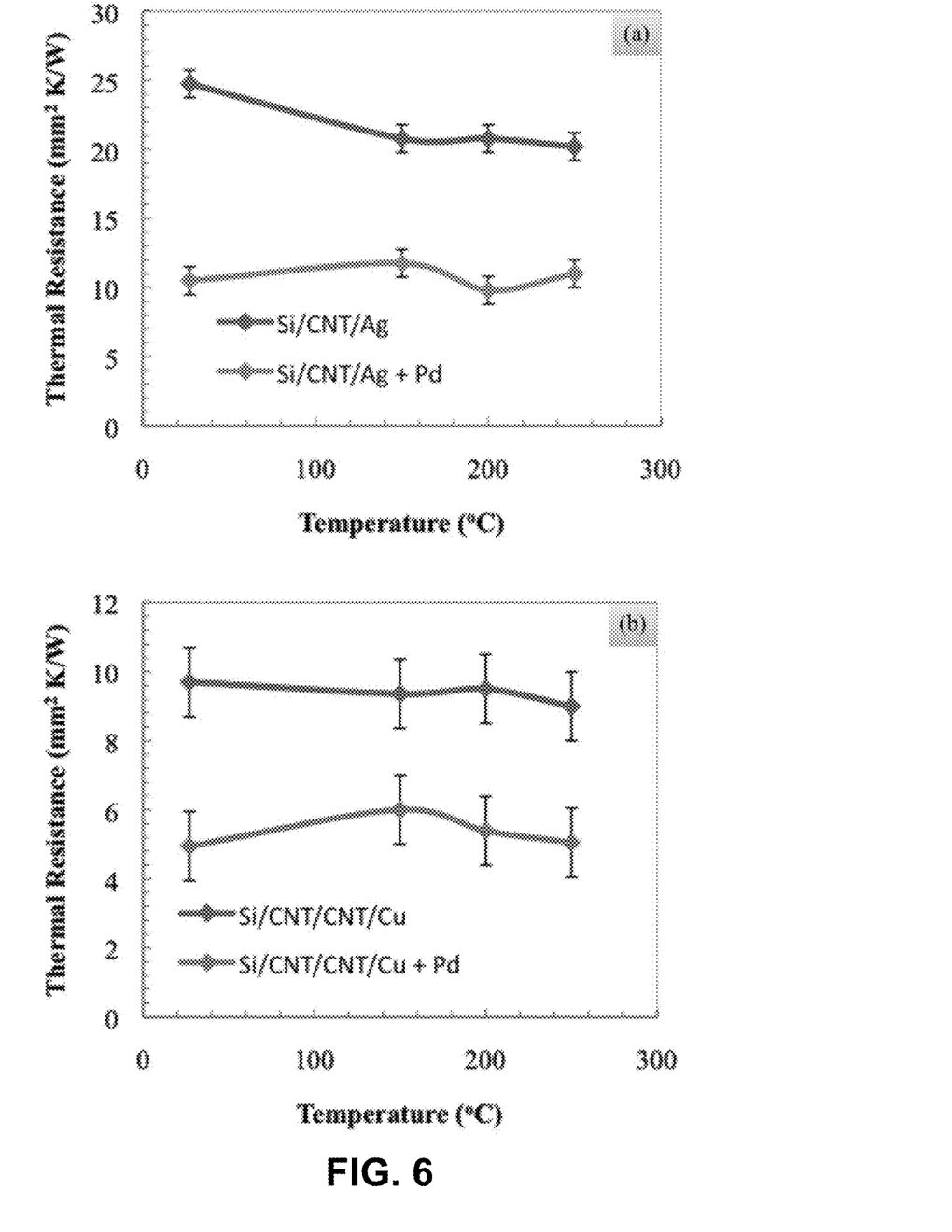
FIG. 6 are graphical representations showing bulk thermal interface resistance as a function of temperature: (a) Si/CNT/Ag with and without Pd nanoparticles and (b) Si/CNT/CNT/Cu with and without Pd nanoparticles.

In order to ensure proper operation of the pressure-field microphone used in the PA setup, the maximum temperature tested was 250° C., and the chamber pressure was limited to 34 kPa. Bulk resistance measurements for the Si/CNT/Ag and Si/CNT/CNT/Cu samples were taken in a temperature range of 27° C. to 250° C. while the component resistance measurement on the second Si/CNT/Ag sample was performed at 27° C. FIG. 6 shows bulk thermal resistance values as a function of temperature for the Si/CNT/Ag and Si/CNT/CNT/Cu samples. The resolved component resistances for the second Si/CNT/Ag are tabulated in Table 1.

TABLE 1

Component thermal resistances for Si/CNT/Ag structure with and without Pd nanoparticles.

| Sample | $R_{Si\text{-}CNT}$ (mm²K/W) | $R_{CNT}$ (mm²K/W) | $R_{CNT\text{-}Ag}$ (mm²K/W) |
|---|---|---|---|
| Si/CNT/Ag | 2 ± 1 | <1 | 40 ± 4 |
| Si/CNT/Ag + Pd | <1 | <1 | 15 ± 1 |

Within the temperature range, the Si/CNT/Ag and Si/CNT/CNT/Cu structures decorated with Pd nanoparticles outperformed the structures without Pd nanoparticles where the average thermal resistance value for the Pd nanoparticle-enhanced structures was 11 mm² K/W and 5 mm² K/W, respectively. Averaging thermal resistances across the temperature range yielded reductions of thermal resistance across the interface of approximately 50% in both cases. In addition, all structures exhibited only small variations in performance across the temperature range, indicating thermal stability and applicability to high-temperature devices.

The summary results in Table 1 indicate that reductions in bulk thermal resistance between decorated and undecorated TIMs occurred at the Si—CNT and CNT-Ag interfaces, with the latter having the largest reduction. These results indicate that the dominant thermal resistance was at the CNT 'free tip' interface as opposed to the growth substrate interface where the CNTs are well adhered. This reduction at the CNT-Ag interface can be attributed to two mechanisms. First, upon thermolysis, a strong bond between at the CNT/Ag was created such that greater contact area was achieved. It is possible that the bond results in the majority of improvement to the reduced phonon reflection at the CNT/Ag interface. In addition, the increase in contact area may reduce phonon reflection at the boundary consisting of nano-sized contacts and provided enhanced pathways for heat conduction.

Thermal treatment of Pd hexadecanethiolate at 230 C in air can produce metallic Pd nanowires with a specific electrical resistivity near 0.300 μΩm. Thermal treatment of structures in this study could have produced a metallic-like bond between CNT free ends and Ag foil via Pd nanoparticles in which a higher electron DOS near the Fermi level at the CNT/Ag interface was established.

Two types of contacts can exist at a CNT/metal interface: side- and end-contacted. Although the general orientation of the, CNT arrays in FIG. 2a is vertical, it is possible that the majority of the contacts have side-contacted geometries upon compression into an interface. For non-bonded, side-contacted geometries, the contact quality depends on tunneling of electrons across an energy barrier created by van der Waals interaction at the metal/CNT interface and since the physical separation between the metal and CNT is comparable to the carbon/metal bond length, tunneling depends on the chemical composition and configuration of electronic states at the surface. If the Ag makes uniform contact to graphene and then transmits an electron across the CNT/Ag interface, then in-plane wave vector conservation is enforced and for good coupling, the metal Fermi wave vector ($k_{f,Ag}=1.2$ Å$^{-1}$) should be comparable to that of graphene ($k_{f,graph.}=4\pi/3a_o=1.70$ Å$^{-1}$). Under weak coupling assumption (i.e., van der Waals interaction), calculated transmission probabilities at a uniform metal/graphene contact have been shown to exhibit a monotonic increase with contact length depending on CNT chirality.

For larger diameter tubes, such as the CNTs in some embodiments of the present invention, wavevector conservation becomes a consideration. However, such conservation principles can be relaxed when disorder (defects and impurities) are present. Plasma-enhanced chemical vapor deposition (PECVD) grown CNTs in previous work have exhibited relatively high defects at the sidewalls due to plasma etching. Thus, the additional disorder from sidewall defects caused by PECVD synthesis and Pd impurities at the CNT/Ag interface could relax wave vector conservation constraints. In this case, additional scattering from defects and Pd impurities could increase the transmission probability across the CNT/Ag interface, mediated by the presence of the Pd nanoparticles. It is possible that similar effects are operative for the two sided TIM configuration (FIG. 4b), with most of the improvement localized at the CNT/CNT and CNT/Cu interfaces.

Figure 7:
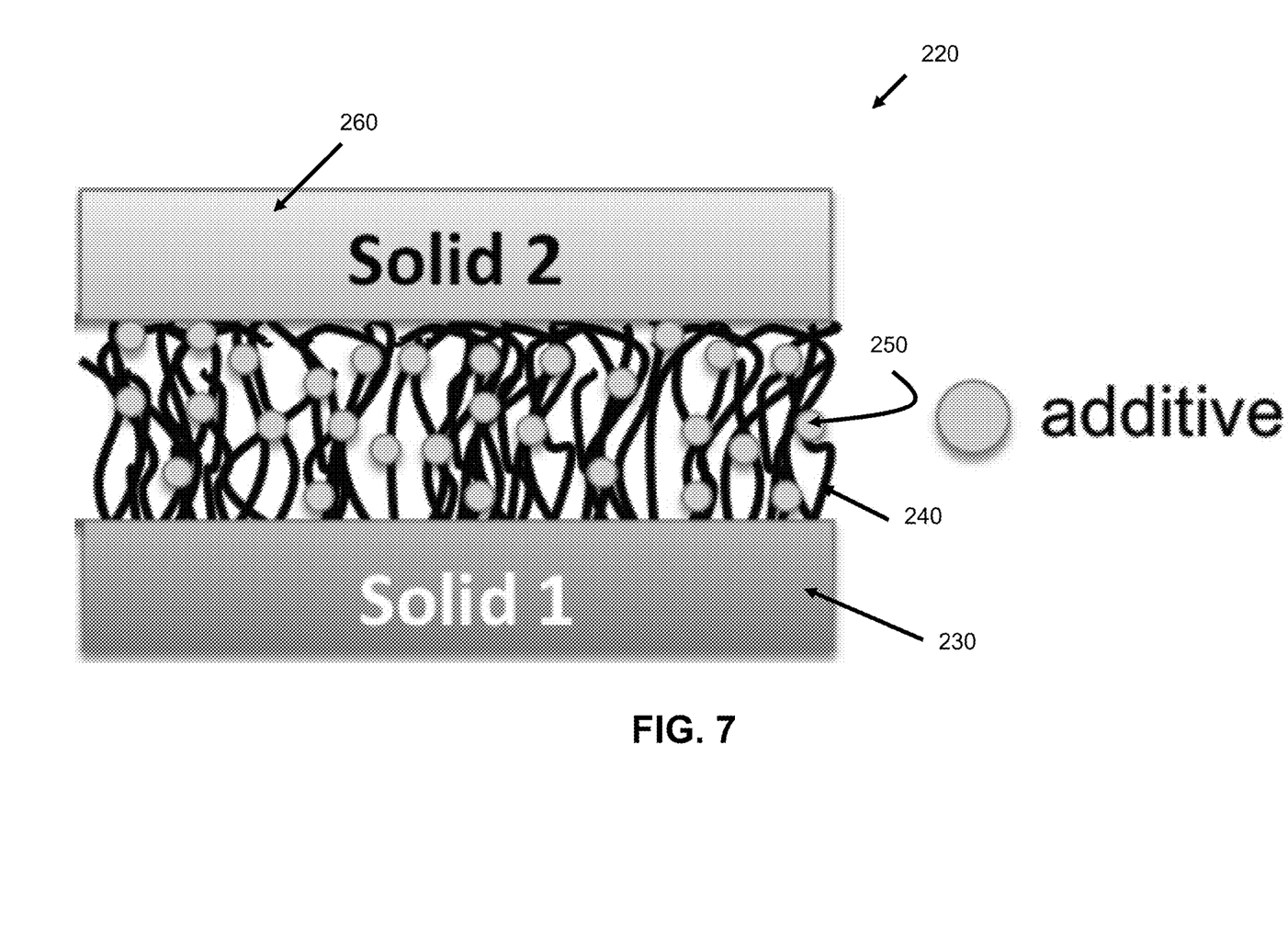
FIG. 7 is a schematic representation of a CNT TIM enhanced with an electron-donating or withdrawing species according to another embodiment of the present invention.
Figure 8:
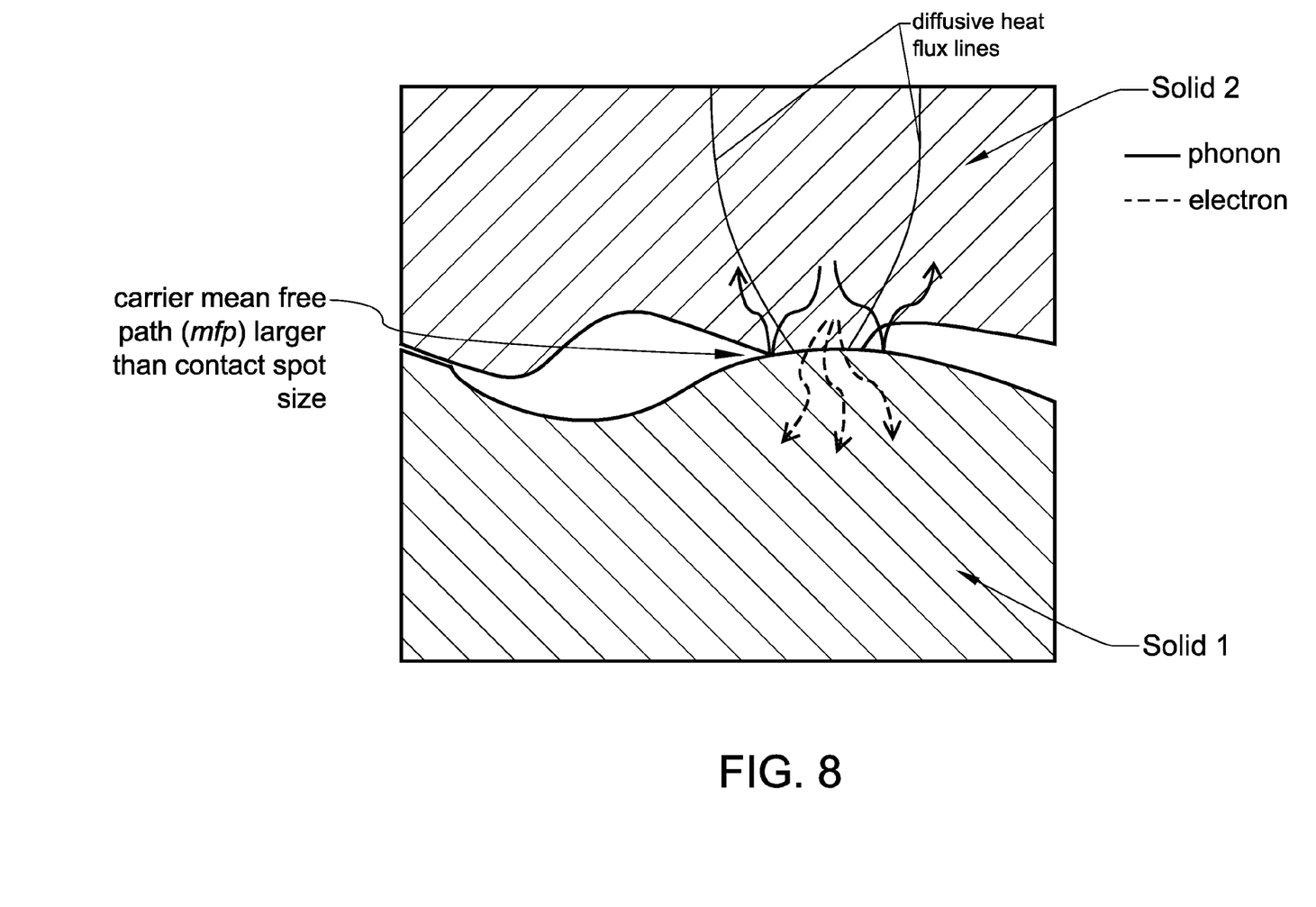
FIG. 8 is an illustration according to another embodiment of the present invention of enhanced thermal conduction by electrons.

Referring to FIGS. 7 and 8, another embodiment of the present invention pertains to a method to reduce the thermal and/or electrical interface resistance between two connecting devices such as an electronic component and a heat sink or another electrical component. The process includes synthesizing CNT arrays on various substrates such as Si or Cu and subsequently applying electron donating or accepting molecular species to the arrays. By altering the charge density in the nanotubes via exposure to electron-donating molecules such as aniline (C6H7N) and tetrathiafulvalene (C6H4S4, TTF) as well as electron-withdrawing molecules such as tetracyanoethylene (C6N4, TONE), the electronic contribution to thermal conductivity at an interface can be enhanced. This approach combined with mechanical conformability of CNT arrays creates a material that is effective in conducting heat (electricity) and providing low interface resistance (thermal or electrical).

Yet other embodiments of the present invention pertain to an apparatus to be inserted between a processor chip or an integrated circuit (IC) device and a heat sink to allow the chips or IC devices to operate at lower temperatures. Yet other embodiments pertain to an apparatus to be inserted between an electrical device and a connecting electrical device to allow electricity to pass between the devices with minimal resistance.

An interface with a CNT array directly synthesized on one side of the interface has been measured to have a thermal resistance less than 8 mm$^2$K/W, which is better than the resistance of the state of the art commercial thermal interface materials. An interface with a CNT array directly synthesized on both sides of the interface has been measured to have a thermal resistance of 4 mm$^2$K/W, which is similar to the resistance of a soldered joint. Park et al. studied the effects of a CNT layer on electrical resistance between Cu substrates. For an apparent contact area of 0.31 mm2, they reported an 80% reduction in electrical resistance from a bare Cu/Cu interface to Cu/MWCNT/Cu interface.

When contact sizes between a nanotube and another material (e.g. CNT-Cu interface) are relatively small there is exists a major impediment to heat flow at the true heterogenous material interface in which ballistic phonon effects can substantially decrease conductance. These effects include impedance mismatch and wave constriction at nanoscale contacts. Some embodiments of the present invention use an approach in which this phonon "bottleneck" is circumvented by altering the charge density in the nanotubes via exposure to electron-donating and withdrawing molecular species. The process includes increasing the electronic contribution to thermal conductivity at a CNT-substrate interface by chemically opening electron channels for the transport of heat.

The thermal interface resistance of a CNT TIM with this process is measured using a photoacoustic technique. At moderate pressures, a 40% reduction in bulk thermal interface resistance from the minimum to maximum aniline concentrations was observed. The use of another electron-donating molecule, TTF, is expected to provide much improved performance because of the increased alteration of the charge density. These results indicate that the enhanced thermal conduction by electrons, with their smaller wavelengths, opens a new route for heat transfer and improves thermal conductance, particularly between the free CNT tips and opposing substrate. FIG. 7 shows a CNT TIM in application which has undergone the process (not to scale). FIG. 8 illustrates the enhanced thermal conduction by electrons in comparison to phonons.

The CNT arrays can be synthesized using any CNT synthesis technique that allows for dense, vertically oriented CNT arrays to be directly grown on both sides or one side of substrates while having strong mechanical adhesion between the CNTs and the surfaces (e.g. microwave plasma chemical vapor deposition (MPCVD) and a Ti underlayer on the substrates surfaces to promote adhesion). Addition of the molecular species (aniline, TTF, TONE) can be accomplished by dip coating the array in the chemical solution and drying in vacuum. TTF and TONE can to be mixed with toluene prior to dip coating the array and drying in vacuum.

In addition to the use of aniline (or phenylamine), the present invention contemplates the use of other aromatic amines, including as examples o-toluidine; 2,4,6-trimethylaniline; anisidine; or 3-trifluoromethylaniline. Further, although the use of TTF has been shown and described, it is understood that other embodiments of the present invention contemplate the use of other organosulfur compounds, including as examples tetracyanoquinodimethane; tetramethyltetrathiafuvalene; tetramethylselenafulvalenes; or dimethylanthracene. In addition, although the use of TCNE has been shown and described, although it is recognized that other embodiments of the present invention contemplate the use of other organic compounds such as tricyanomethane; tetracyanoethylene; tetracyanoquinodimethanide; nitrobenzene; 1,3,6,8-Pyrenetetrasulfonic acid tetra sodium salt hydrate; or 9,10-dibromoanthracene.

Further, some embodiments of the present invention pertain to the use of electron-donating materials, some non-limiting examples of which include tetracyanoquinodimethane; tetramethyltetrathiafulvalene; tetramethylselenafulvalenes; or dimethylanthracene. The use of an electron-withdrawing material has been disclosed, and it is recognized that non-limiting list of examples includes tricyanomethane; tetracyanoethylene; tetracyanoquinodimethanide; nitrobenzene; 1,3,6,8-pyrenetetrasulfonic acid tetra sodium salt hydrate; or 9,10-dibromoanthracene.

FIG. 7 shows an assembly 220 similar to that of assembly 20 of FIG. 4(a). However, instead of attaching metal nanoparticles to the carbon nanotubes 240, assembly 220 contemplates processing the array of nanotubes 240 with either an electron-donating species or an electron-withdrawing species. As discussed with regards to FIG. 4(a), the nanotubes 240 are grown from a substrate 230, and the free tips of the nanotubes 240 are placed in contact with another substrate 260. The process described herein for changing the charge density of the carbon nanotubes is applied to this assembly and provides molecules 250 of the donating or withdrawing species attached to CNTs 240 at various locations along their length. The charge density of the attached carbon nanotube is changed, and therefore its heat conducting ability is enhanced. Yet other embodiments of the present invention contemplate an assembly related to FIG. 7, but also similar to that of FIG. 4(b). In these embodiments there are two substrates from which CNTs have been grown. The free tips of the two forests of CNTs are brought into contact, and subsequently placed in solution with an electron-donating species or an electron-withdrawing species.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A method for fabricating a thermal interface, comprising:
providing a growth substrate;
growing carbon nanotubes from the growth substrate, each nanotube being anchored at one end to the growth substrate;
aligning the nanotubes in a direction generally perpendicular to the growth substrate;
applying a solution containing a metal organic compound to the nanotube array, wherein the solution includes a metal alkanethiolate; and
thermally decomposing the solution around the nanotubes and the substrate.

2. The method of claim 1 which further comprises compressing the nanotubes during said decomposing.

3. The method of claim 1 wherein said decomposing is performed in air, nitrogen or high vacuum.

4. The method of claim 1 wherein said decomposing is performed in a heated environment.

5. The method of claim 1 which further comprises increasing the number of defect sites in the CNTs prior to said applying the solution to the aligned CNT array.

6. The method of claim 1 wherein the solution includes a metal butanethiolate.

7. The method of claim 1 wherein the solution includes one of palladium hexadecanethiolate or palladium butanethiolate.

8. The method of claim 1 wherein the solution includes a metal acetate, thiol and toluene.

9. The method of claim 1 wherein the solution is solvent based.

10. The method of claim 1 which further comprises removing the excess thiolate during said decomposing.

11. The method of claim 1 wherein the substrate includes a layer of at least one of Ti or Cr to promote adhesion of the carbon nanotubes.

12. The method of claim 1 wherein the substrate includes material chosen from the group of aluminum, platinum, gold, nickel, iron, tin, lead, silver, titanium, indium, or copper.

13. The method of claim 1 wherein said growing is by microwave plasma chemical vapor deposition.

14. The method of claim 1 wherein said carbon nanotubes are multi-walled.

15. The method of claim 1 which further comprises:
providing a contact substrate;
contacting carbon nanotubes to the contact substrate; and
thermally decomposing the solution around the nanotubes, the growth substrate and the contact substrate.

16. A method for fabricating a thermal interface, comprising:
providing a first growth substrate and a second growth substrate;
growing a first plurality of carbon nanotubes from a first surface of the first growth substrate, each nanotube of the first plurality being anchored at one end to the first surface;
growing a second plurality of carbon nanotubes from a second surface of the second growth substrate, each nanotube of the second plurality being anchored at one end to the second surface;
placing the first plurality of nanotubes in contact with the second plurality of nanotubes with the first surface being opposite of the second surface;
applying a solution containing a metal organic compound to the contacting nanotubes and to the first surface and the second surface, wherein the solution includes a metal alkanethiolate; and
thermally decomposing the solution around the contacting nanotubes and the first surface and the second surface.

17. The method of claim 16 which further comprises pressing the first surface against the second surface before said decomposing.

* * * * *

UNITED STATES PATENT AND TRADEMARK OFFICE
CERTIFICATE OF CORRECTION

Page 1 of 1

PATENT NO. : 8,541,058 B2
APPLICATION NO. : 12/719759
DATED : September 24, 2013
INVENTOR(S) : Timothy S. Fisher et al.

It is certified that error appears in the above-identified patent and that said Letters Patent is hereby corrected as shown below:

Title Page, below Item (54):

"(76) Inventors:" should read --(75) Inventors:--.

Title Page, item (73), please insert Assignees:

--Purdue Research Foundation, West Lafayette, Indiana--
and
--Jawaharial Nehru Centre for Advanced Scientific Research, India--.

Signed and Sealed this
Sixth Day of May, 2014

Michelle K. Lee
*Deputy Director of the United States Patent and Trademark Office*